(12) United States Patent
Tonosaki et al.

(10) Patent No.: US 6,414,649 B2
(45) Date of Patent: *Jul. 2, 2002

(54) SIGNAL PROCESSING APPARATUS

(75) Inventors: Satoshi Tonosaki, Tokyo; Yasuyuki Yamazaki, Matsudo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,702

(22) Filed: Oct. 27, 1998

Related U.S. Application Data

(62) Division of application No. 08/335,918, filed on Nov. 8, 1994, now Pat. No. 5,861,908.

(30) Foreign Application Priority Data

Nov. 9, 1993  (JP) .............................................. 5-279415
Dec. 22, 1993 (JP) .............................................. 5-324258

(51) Int. Cl.[7] .................................................. G09G 5/00
(52) U.S. Cl. ............................................. 345/1; 348/51
(58) Field of Search ...................... 345/1, 7, 8; 348/51, 348/53, 55–58

(56) References Cited

U.S. PATENT DOCUMENTS

| | | | | |
|---|---|---|---|---|
| 3,915,548 A | * | 10/1975 | Opittek et al. ................ 350/3.5 |
| 4,562,463 A | * | 12/1985 | Lipton .......................... 348/42 |
| 4,853,773 A | | 8/1989 | Hibino et al. .................. 348/65 |
| 4,954,890 A | * | 9/1990 | Park .............................. 348/42 |
| 5,001,555 A | * | 3/1991 | Park .............................. 348/51 |
| 5,041,823 A | | 8/1991 | Johnson et al. ................ 345/94 |
| 5,193,000 A | * | 3/1993 | Lipton et al. .................. 348/43 |
| 5,357,277 A | | 10/1994 | Nakayoshi et al. ............ 348/55 |
| 5,781,229 A | * | 7/1998 | Zediker et al. ................ 348/51 |
| 5,790,284 A | * | 8/1998 | Taniguchi et al. ............ 359/15 |
| 5,861,908 A | * | 1/1999 | Tonosaki et al. .............. 348/57 |
| 5,886,675 A | * | 3/1999 | Aye et al. ........................ 345/7 |
| 5,905,525 A | * | 5/1999 | Ishibashi et al. .............. 348/39 |

FOREIGN PATENT DOCUMENTS

| | | |
|---|---|---|
| DE | 3910420 | 3/1989 |
| EP | 0253121 A2 | 1/1988 |
| JP | 0253121 A2 | 1/1988 |
| JP | 5-103349 | 4/1993 |
| JP | 6050737 | 5/1994 |

OTHER PUBLICATIONS

Patent Abstract of Japan vol. 18 No. 281, May 27, 1994 (Abstract of JP6050737).

\* cited by examiner

*Primary Examiner*—Kent Chang
*Assistant Examiner*—Vanel Frenel
(74) *Attorney, Agent, or Firm*—Morgan & Finnegan, L.L.P.

(57) ABSTRACT

A signal processing apparatus is provided with processing units capable of reducing the number of signal processing means and the number of adjustments of a delay time between reversal and non-reversal of video-signal polarity in each of two signal paths in an arrangement in which two liquid-crystal displays (LCDs) are provided in a head-mounted display worn by an observer and each of the two displays is used to display video information viewed by the observer. The signal processing apparatus includes first and second signal sources (1 and 2 each of which generates a video signal, reversing unit 7 for reversing the polarity of one of the two video signals, first selector selectively supplying one of the video signals to the reversing unit, first and second display units (3 and 4 for converting the video signals to respective ones of optical signals, and second selector for selectively supplying a video signal whose polarity is or is not reversed by the reversing unit to the first and second display units.

24 Claims, 11 Drawing Sheets

SIGNAL PROCESSING APPARATUS

This is a divisional of co-pending application Ser. No. 08/335,918 filed Nov. 8, 1994 is now 5,861,908.

BACKGROUND OF THE INVENTION

This invention relates to an image signal processing apparatus for displaying an image. More particularly, the invention relates to a signal processing apparatus for displaying signals from two signal sources on each of two display units.

DESCRIPTION OF THE RELATED ART

When video information is displayed on a display device such as a liquid-crystal display (referred to as an "LCD" hereinafter), it is necessary to prevent a residual image caused by DC components in the video signal. In the prior art, this is accomplished by using a method in which the polarity of the video signal is reversed at fixed periods.

Further, head-mounted displays worn by an observer have been proposed in which two LCDs are used and video information for the left and right eyes of the observer is displayed on respective ones of the LCDs. When two LCDs are used, however, it is necessary that the video signal be reversed in polarity on each signal path at fixed periods. One conventional method of achieving this is to provide each signal path with signal processing means for polarity reversal and signal processing means for no reversal of polarity and switch between the two means in each signal path. Another method is to provide each signal path with one signal processing means capable of switching between reversed/non-reversed polarity, and switch the polarity of the signal processing means per se to thereby change over the polarity of the video signal.

However, with the method of providing the signal processing means for reversal and non-reversal in the prior art described above, there are too many signal processing means. And with the method of providing the signal processing means that can be switched between reversal/non-reversal and changing over the polarity of this signal processing means, it is necessary to adjust the amount of delay, between reversal time and non-reversal time in each signal processing means.

Further, methods of displaying a three-dimensional image on a display unit have been proposed in the prior art. According to one method, video signals representing left- and right-eye images of an object, in which the images differ by an amount corresponding to parallax between the two eyes of the observer, are fed into a display unit such as CRT so as to alternate between the left eye image field and the right eye image field of the object. The observer wears a device such as glasses having a shutter function. By opening and closing the shutters in sync with the changeover between the video signals for the left and right eyes, the image for the left eye is sent to the left eye and the image for the right eye is sent to the right eye, whereby three-dimensional vision is obtained.

With this example of the prior art, however, a circuit is required for switching between the two video signals every field in order to obtain three-dimensional vision. In addition, the glasses having the shutter function must be worn and the shutter must be opened and closed in sync with the images. Furthermore, even if this approach is adopted, flicker is produced since the image seen by only one eye occurs every other field.

SUMMARY OF THE INVENTION

An object of the present invention is to provide means through which the number of signal processing means can be reduced as well as the number of adjustments of delay time between reversal and non-reversal of video-signal polarity.

Another object of the present invention is to provide a signal processing apparatus provided with two video-signal input terminals, two signal processing means and two display means one of which can be seen only by the right eye and the other of which can be seen only by the left eye, the video signal for the right eye is sent to the display means for the right eye and the video signal for the left eye is sent to the display means for the left eye, whereby a two-dimensional image or a three-dimensional image can be displayed without producing flicker.

A further object of the present invention is to provide a signal processing apparatus in which a pair of parallax image signals for both eyes, signals which are respective images having a wide angle of view in the horizontal direction and identical image signals are sent to first and second video-signal input terminals, whereby a three-dimensional image, a panoramic image and identical images, respectively, are obtained.

Yet another object of the present invention is to provide a signal processing apparatus having the minimum amount of circuitry, the apparatus being provided with means for synchronizing video signals which have entered from two video-signal input terminals, whereby two signal processing means may be consolidated as a single shared signal processing means and two drive circuits may be consolidated as a single shared drive circuit.

A further object of the invention is to provide a signal processing apparatus in which video signals which have entered from two video-signal input terminals are selectively switched between video signals and displayed on two display means in a first or second display mode, whereby a two-dimensional image or a three-dimensional image is displayed without producing flicker, and in which the same two-dimensional image is displayed on the two display means in a third or fourth display mode.

A further object of the present invention is to provide a signal processing apparatus provided with two detecting means for detecting the absence or presence of video signals inputted from two video-signal input means, in which switching between a two-dimensional image display and a three-dimensional image display is performed automatically depending upon whether or not video signals are being applied to the two video-signal input terminals.

Still another object of the present invention is to provide a signal processing apparatus in which, when a two-dimensional image is displayed in the third mode or fourth mode, consumed current at the time of use is reduced by employing either of the two signal processing means.

Still another object of the present invention is to provide a signal processing apparatus in which, in a case where video signals enter from two video-signal input terminals, video signals supplied to the left and right display means are switched between selectively, whereby it is possible to prevent the video signals from being supplied to the left-eye and right-eye display means erroneously and displayed on the wrong sides.

According to the present invention, the foregoing objects are attained by providing a signal processing apparatus comprising reversing means for reversing polarity of a video signal, and mode selecting and executing means. for alternately selecting and then executing a first mode and a second mode at a prescribed time interval, wherein the first mode is for displaying a first video signal on first display means and inputting a second video signal to the reversing means to reverse the polarity of the second video signal and then display the second video signal on second display means, and the second mode is for inputting the first video signal to the reversing means to reverse the polarity of the first video signal and then display the first video signal on the first display means, and displaying the second video signal on the second display means.

Further, according to the present invention, the foregoing objects are attained by providing a signal processing apparatus comprising first and second signal processing means for respectively converting a first video signal and a second video signal into first and second converted video signals, of a prescribed format, capable of being displayed, first display means for displaying the first converted video signal at a position capable of being seen solely by an observer's right eye, and second display means for displaying the second converted video signal at a position capable of being seen solely by the observer's left eye.

Other features and advantages of the present invention will be apparent from the following description taken in conjunction with the accompanying drawings, in which like reference characters designated the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail in accordance with the accompanying drawings.

First Embodiment

Figure 1:
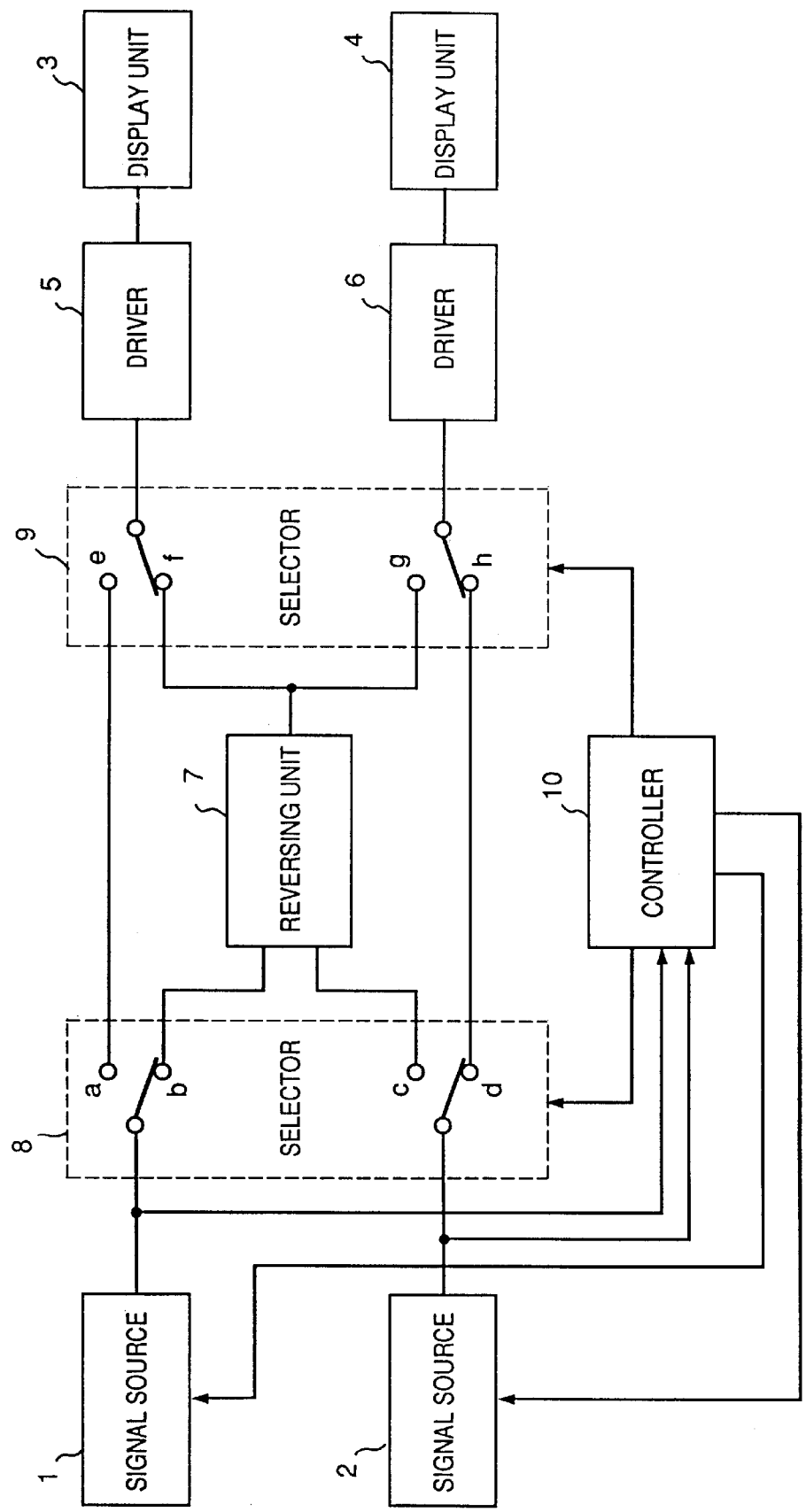
FIG. 1 is a block diagram illustrating the construction of a signal processing apparatus according to a first embodiment of the present invention.

FIG. 1 is a block diagram showing the construction of a first embodiment of a signal processing apparatus according to the present invention. The apparatus includes a first signal source 1 for outputting a first video signal, a second signal source 2 for outputting a second video signal, a first display unit 3 for displaying the first video signal from the first signal source 1, a second display unit 4 for displaying the second video signal from the second signal source 2, a first-driver 5 for supplying the first display unit 3 with the first video signal, a second driver 6 for supplying the second display unit 4 with the second video signal, a reversing unit 7 for reversing the polarity of the video signal from the first source 1 or second signal source 2, a first selector 8 for selectively inputting the video signal from the first source 1 or second signal source 2 to the reversing unit 7, a second selector 9 for selectively supplying the first driver 5 and the second driver 6 with the reversed video signal by the reversing unit 7, and a controller 10 for counting horizontal scanning signals of the signal sources 1, 2 and controlling the operation of the first selector 8 and second selector 9.

The operation of this embodiment will now be described.

The first and second video signals are outputted by the first and second signal sources, 1, 2, respectively. The controller 10 counts the horizontal scanning signals of each of the video signals entering from the signal sources 1, 2. Upon discriminating an odd-numbered line, the controller 10 connects the first selector 8 to terminals b and d so as to input the first video signal to the reversing unit 7. At this time the second video signal is not fed into the reversing unit 7 but is applied directly to the second selector 9. The first video signal which has entered the reversing unit 7 has its polarity reversed and is then outputted to the second selector 9. Next, the second selector 9 is connected to terminals f and h so that the first video signal of reversed polarity is applied to the first driver 5 and the second video signal is applied to the second driver 6, whence the first and second video signals are supplied to the first and second display units 3, 4, respectively.

Upon discriminating an even-numbered line when counting the horizontal scanning lines, the controller connects the first selector 8 to terminals a and c so as to input the second video signal to the reversing unit 7. At this time the first video signal is not fed into the reversing unit 7 but is applied directly to the second selector 9. The second video signal which has entered the reversing unit 7 has its polarity reversed and is then outputted to the second selector 9. Next, the second selector 9 is connected to terminals e and a so that the first video signal is applied to the first driver 5 and the second video signal of reversed polarity is applied to the second driver 6, whence the first and second video signals are supplied to the first and second display units 3, 4, respectively. It should be noted that if the first and second signal sources 1, 2 are not in synchronism with each other when the controller 10 counts the horizontal scanning signals, the controller 10 applies feedback to the first and second signal sources, to synchronize them.

By thus changing over the signal applied to the reversing unit 7 line by line, the single reversing unit 7 can be shared by the two signal paths.

Further, a method may be adopted in which the changeover of the video signal applied to the reversing unit 7 is performed not every line but every several lines, randomly in line units, every pixel or randomly every pixel. It is permissible to adopt an arrangement in which, regardless of the method, the controller 10 counts the number of lines (number of pixels) in which signal reversal has been performed and makes the percentage of the number of lines (number of pixels) in which signal reversal has taken place and the percentage of the number of lines (number of pixels) in which signal reversal has not taken place the same on a per-screen basis. Further, if polarity reversal is performed pixel by pixel, the percentage of the number of pixels in which reversal has taken place and the percentage of the number of pixels in which signal reversal has not taken place should be made the same on a per-line basis. Further, an arrangement may be adopted in which one screen is partitioned into a plurality of blocks and the number of pixels in which reversal has taken place and the number of pixels in which signal reversal has not taken place are made the same in percentage on a per-block basis.

Second Embodiment

Figure 2:
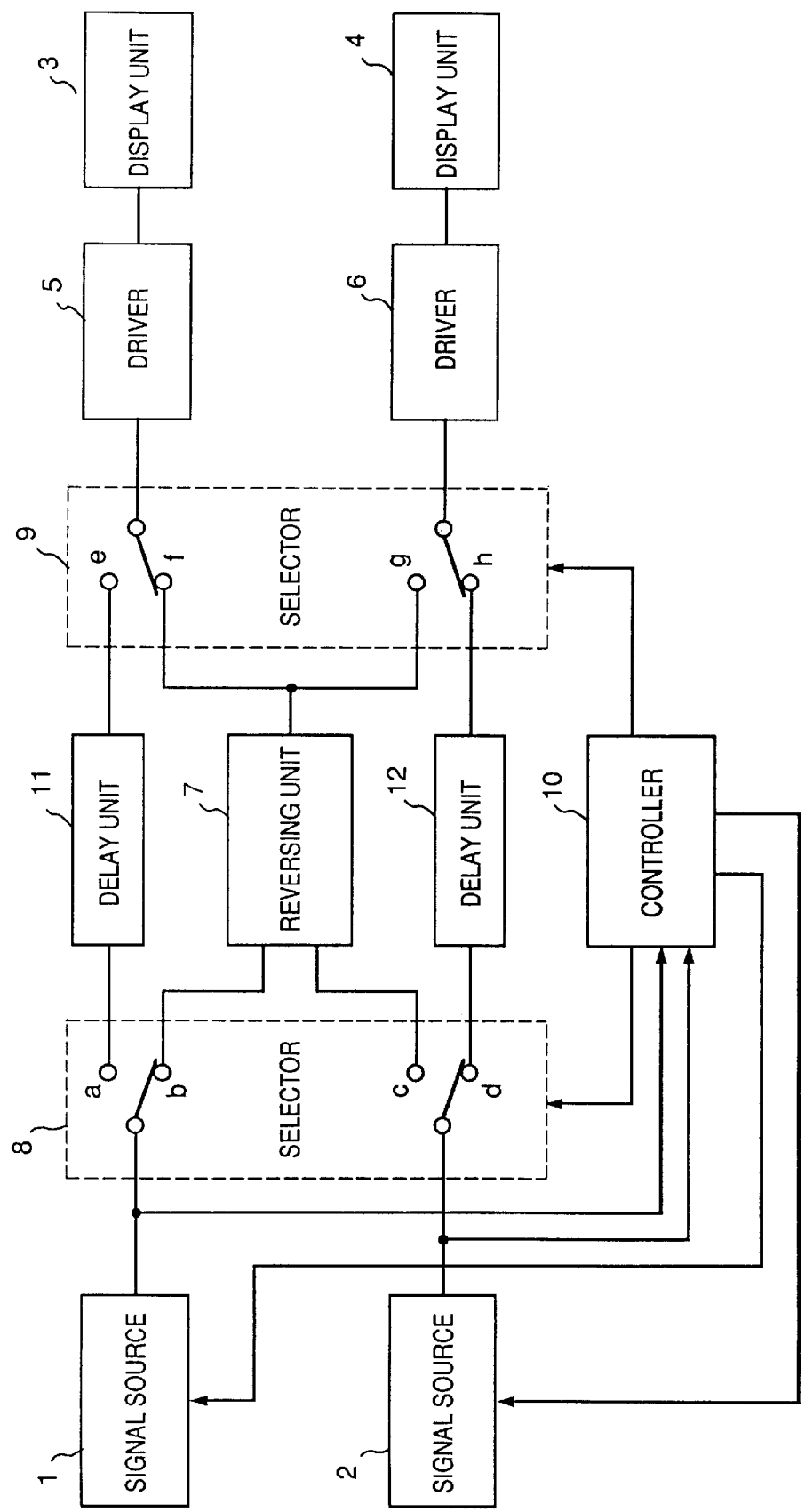
FIG. 2 is a block diagram illustrating the construction of a signal processing apparatus according to a second embodiment of the present invention.

FIG. 2 is a block diagram showing the construction of a second embodiment of a signal processing apparatus according to the present invention. Numerals 1 through 7 and numeral 10 denote components identical with (corresponding to) components in the first embodiment; these components need not be described again. The characterizing feature of the second embodiment is the provision of first and second delay units 11, 12 for subjecting the video signals to a delay time equivalent to the delay imposed by operation of the reversing unit 7. The first delay unit 11 is provided between the terminals a, e of the first and second selectors 8, 9, respectively, and the second delay unit 12 is provided between the terminals d, h of the first and second selectors 8, 9, respectively. The first selector 8 selectively applies the video signal from the first signal source 1 to the reversing unit 7 or the delay unit 11 and selectively applies the video signal from the second signal source 2 to the reversing unit 7 or the delay unit 12. The second selector 9 supplies either the video signal reversed in polarity by the reversing unit 7 or the video signal delayed by the delay unit 11 to the driver 5, and supplies either the video signal reversed in polarity by the reversing unit 7 or the video signal delayed by the delay unit 12 to the driver 6.

In operation, the first and second video signals are outputted by the first and second signal sources, 1, 2, respectively. The controller 10 counts the horizontal scanning signals of each of the video signals entering from the signal sources 1, 2. Upon discriminating an odd-numbered line, the controller 10 connects the first selector 8 to terminals b and d so as to input the first video signal to the reversing unit 7. At this time the second video signal is not fed into the reversing unit 7 but is applied to the delay unit 12. The first video signal which has entered the reversing unit 7 has its polarity reversed and is then outputted to the second selector 9. The second video signal which has entered the delay unit 12 is delayed by a period of time identical to that required by the operation of the reversing unit 7. The delayed video signal is then delivered to the second selector 9. Next, the second selector 9 is connected to terminals f and h so that the first video signal of reversed polarity is applied to the first driver 5 and the second video signal is applied to the second driver 6, whence the first and second video signals are supplied to the first and second display units 3, 4, respectively.

Upon discriminating an even-numbered line when counting the horizontal scanning lines, the controller 10 connects the first selector 8 to terminals a and c so as to input the second video signal to the reversing unit 7. At this time the first video signal is not fed into the reversing unit 7 but is applied to the delay unit 11. The second video signal which has entered the reversing unit 7 has its polarity reversed and is then outputted to the second selector 9. The first video signal which has entered the delay unit 11 is delayed by a period of time identical to that required by the operation of the reversing unit 7. The delayed video signal is then delivered to the second selector 9. Next, the second selector 9 is connected to terminals e and a so that the first video signal is applied to the first driver 5 and the second video signal of reversed polarity is applied to the second driver 6, whence the first and second video signals are supplied to the first and second display units 3, 4, respectively. It should be noted that if the first and second signal sources 1, 2 are not in synchronism with each other when the controller 10 counts the horizontal scanning signals, the controller 10 applies feedback to the first and second signal sources to synchronize them.

By thus changing over the signal applied to the reversing unit 7 line by line, the single reversing unit 7 can be shared by the two signal paths.

Further, a method may be adopted in which the changeover of the video signal applied to the reversing unit 7 is performed not every line but every several lines, randomly in line units, every pixel or randomly in pixel units. It is permissible to adopt an arrangement in which, regardless of the method, the controller 10 counts the number of lines (number of pixels) in which signal reversal has been performed and makes the percentage of the number of lines (number of pixels) in which signal reversal has taken place and the percentage of the number of lines (number of pixels) in which signal reversal has not taken place the same on a per-screen basis. Further, if polarity reversal is performed pixel by pixel, the percentage of the number of pixels in which reversal has taken place and the percentage of the number of pixels in which signal reversal has not taken place should be made the same on a per-line basis. Further, an arrangement may be adopted in which one screen is partitioned into a plurality of blocks and the number of pixels in which reversal has taken place and the number of pixels in which signal reversal has not taken place are made the same in percentage on a per-block basis.

Third Embodiment

Figure 3:
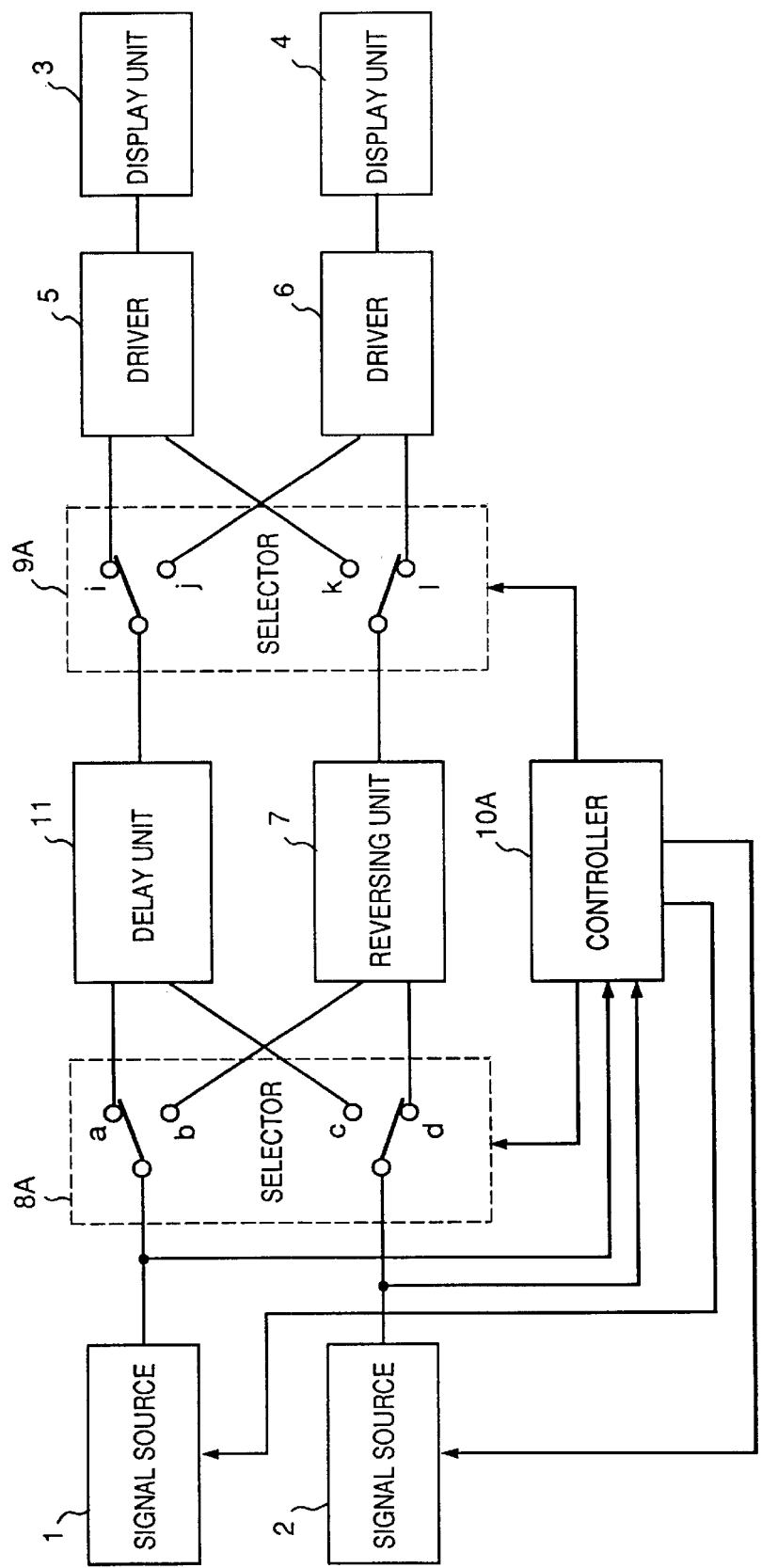
FIG. 3 is a block diagram illustrating the construction of a signal processing apparatus according to a third embodiment of the present invention.

FIG. 3 is a block diagram showing the construction of a third embodiment of a signal processing apparatus according to the present invention. Numerals 1 through 7 denote components identical with (corresponding to) components in the first embodiment; these components need not be described again. A first selector 8A is for selectively inputting the video signal from the first signal source 1 to the reversing unit 7 and delay unit 11 and for selectively inputting the video signal from the second signal source 2 to the reversing. unit 7 and delay unit 11. A second selector 9A is for selectively supplying the video signal reversed in polarity by the reversing unit 7 to the drivers 5 and 6, and for selectively supplying the video signal delayed by the delay unit 11 to the drivers 5 and 6. A controller 10A is for counting horizontal scanning signals of the signal sources 1, 2 and controlling the operation of the first selector 8A and second selector 9A. The delay unit 11 subjects the video signals to a delay time equivalent to the delay imposed by operation of the reversing unit 7.

In operation, the first and second video signals are outputted by the first and second signal sources, 1, 2, respectively. The controller 10A counts the horizontal scanning signals of each of the video signals entering from the signal sources 1, 2. Upon discriminating an odd-numbered line, the controller 10A connects the first selector 8A to terminals b and c so as to input the first video signal to the reversing unit 7 and the second video signal to the delay unit 11. The first video signal which has entered the reversing unit 7 has its polarity reversed and is then outputted to the second selector 9A. The second video signal which has entered the delay unit 11 is delayed by a period of time identical to that required by the operation of the reversing unit 7. The delayed video signal is then delivered to the second selector 9A. Next, the second selector 9A is connected to terminals i and k so that first video signal of reversed polarity is applied to the first driver 5 and the delayed second video signal is applied to the second driver 6, whence the first and second video signals are supplied to the first and second display units 3, 4, respectively.

Upon discriminating an even-numbered line when counting the horizontal scanning lines, the controller 10A connects the first selector 8A to terminals a and d so as to input the second video signal to the reversing unit 7 and input the first video to the delay unit 11. In the same manner as when the odd-numbered line is discriminated, the second video signal which has entered the reversing unit 7 is reversed in polarity and then delivered to the second selector 9A. The first video signal inputted to the delay unit 11 is delayed by a period of time identical to that required for the reversing unit 7 to operate, and the delayed video signal is then delivered to the second selector 9A. Next, the second selector 9A is connected to terminals i, i so that the delayed first video signal enters the first driver 5 and the second video signal reversed in polarity enters the second driver 6, whence the first and second video signals are supplied to the first and second display units 3, 4, respectively. It should be noted that if the first and second signal sources 1, 2 are not in synchronism with each other when the controller 10A counts the horizontal scanning signals, the controller 10A applies feedback to the first and second signal sources to synchronize them.

By thus switching the destinations of the first and second video signals between the reversing unit 7 and the delay unit 11 line by line, the single reversing unit 7 and the delay unit 11 can each be shared by the two signal paths.

Further, a method may be adopted in which the changeover of the video signal applied to the reversing unit 7 is performed not every line but every several lines, randomly in line units, every pixel or randomly in pixel units. It is permissible to adopt an arrangement in which, regardless of the method, the controller 10A counts the number of lines (number of pixels) in which signal reversal has been performed and makes the percentage of the number of lines (number of pixels) in which signal reversal has taken place and the percentage of the number of lines (number of pixels) in which signal reversal has not taken place the same on a per-screen basis. Further, if polarity reversal is performed pixel by pixel, the percentage of the number of pixels in which reversal has taken place and the percentage of the number of pixels in which signal reversal has not taken place should be made the same on a per-line basis. Further, an arrangement may be adopted in which one screen is partitioned into a plurality of blocks and the number of pixels in which reversal has taken place and of the number of pixels in which signal reversal has not taken place are made the same in percentage on a per-block basis.

Thus, in accordance with the embodiments described above, one reversing unit can be shared by two signal paths by switching between signals, which are applied to the reversing unit, every line. Further, one reversing unit and one delay unit can be shared by two signal lines by switching destinations of the first and second video signals between the reversing unit 7 and the delay unit 11 every line. This makes it possible to simplify the apparatus by reducing the number of signal processors or the number of delays which are applied at the time of reversal/non-reversal.

Fourth Embodiment

A fourth embodiment of the present invention will now be described in detail with reference to drawings.

Figure 4:
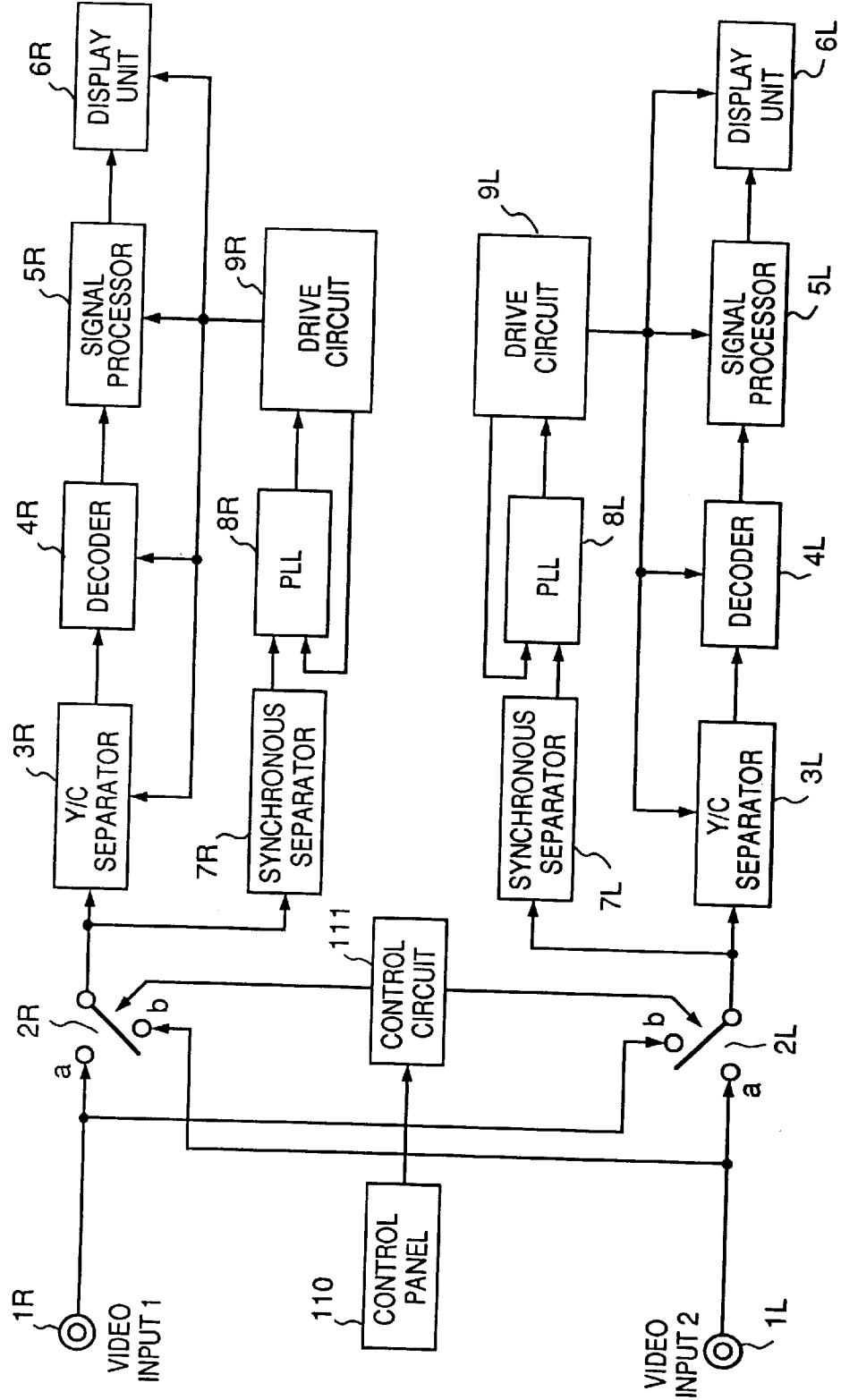
FIG. 4 is a block diagram illustrating the construction of a signal processing apparatus according to a fourth embodiment of the present invention.

FIG. 4 is a block diagram illustrating the construction of a signal processing apparatus according to a fourth embodiment of the present invention. The apparatus has input terminals 1R, 1L for video signals, switch circuits 2R, 2L for switching between the input signals, Y/C separating circuits 3R, 3L for separating a video signal into a luminance signal (Y signal) and a color signal (C signal), decoders 4R, 4L each for producing signals indicative of the three primary colors R, G, B from the Y and C signals, signal processing circuits 5R, 5L for executing processing needed to display the R, G, B signals on respective display units 6R, 6L such as CRTs or LCDs, synchronous separating circuits 7R, 7L for separating synchronizing signals from the video signal, PLL circuits 8R, 8L, driver circuits 9R, 9L for driving the respective display units and other circuits, a control panel 110 for switching between input signals, and a control circuit 111 for controlling the switch circuits 2R, 2L on the basis of a signal from the control panel 110.

The operation of the fourth embodiment of the present invention will now be described with reference to FIG. 4. First, a case will be described in which the switch circuits 2R, 2L are each connected to a side a.

The video signal which has entered from the video-signal input terminal 1R is applied to the Y/C separating circuit 3R and synchronous separating circuit 7R through the switch circuit 2R, and the video signal is separated into the Y and C signals by the Y/C separating circuit 3R. The Y and C signals are applied to the decoder 4R, which produces signals of the three primary colors R, G, B from the Y and C signals. The R, G, B signals are processed by the signal processing circuit 5R in order to be displayed on the display unit 6R, and the processed signals are then supplied to the display unit 6R. Further, the synchronous separating circuit 7R separates a synchronizing signal from the video signal applied thereto and applies the synchronizing signal to the PLL circuit 8R, whereby a phase-locked loop is formed to control the driving frequency of the drive circuit 9R. The latter outputs drive pulses for driving the circuits 3R, 4R, 5R and pulses for driving the display unit 6R. The components whose reference numerals are accompanied by the "R" character operate in the same manner as the corresponding components described above.

Figure 8A:
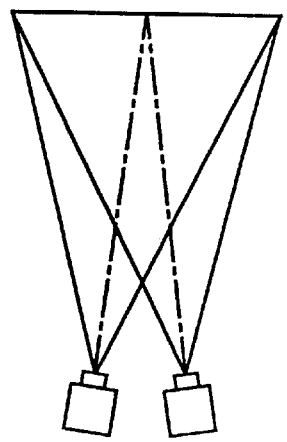
FIGS. 8a, 8b are diagrams for describing states in which a three dimensional image and a panoramic image, respectively, are captured by two cameras.
Figure 9A:
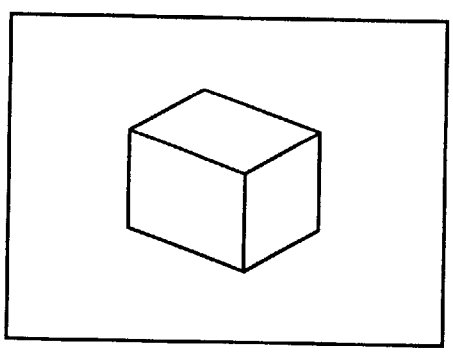
FIGS. 9a through 9c are diagrams showing right-eye image video, left-eye image video and a three-dimensional fused image, respectively, of an object when display of a three-dimensional image is presented.
Figure 9B:
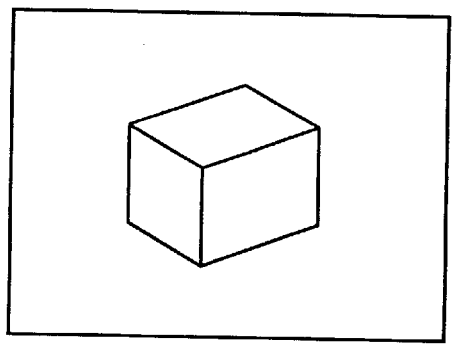
Figure 9C:
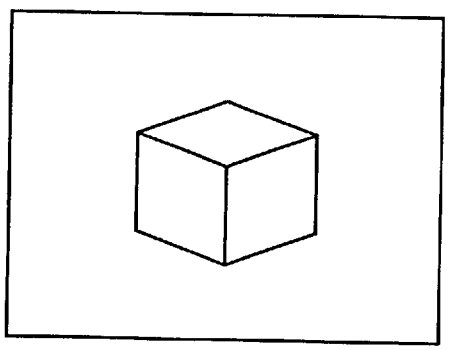

The display unit 6R is placed at a location where it can be observed solely by the right eye of the observer, and the display unit 6L is placed at a location where it can be observed solely by the left eye of the observer. The video signal entering from the video-signal input terminal 1R is displayed on the display unit 6R, and the video signal entering from the video-signal input terminal 1L is displayed on the display unit 6L. This arrangement shall be referred to as a first display mode. Further, when the switch circuits 2R, 2L have both been connected to the b side, the video signal from the video-signal input terminal 1R is displayed on the display unit 6L and the video signal from the video-signal input terminal 1L is displayed on the display unit 6R. This shall be referred to as the second display mode. In the first and second display modes, two cameras are placed as shown in FIG. 8a, for example, and video signals of right- and left-eye images of an object are obtained from the two cameras, with the video signals differing by an amount corresponding to the parallax between the two eyes of the observer, as shown in FIGS. 9a and 9b. These video signals enter from the video-signal input terminals 1R, 1L, respectively, as a result of which the video signals are displayed on the display units 6R, 6L, respectively. By fusing these two video signals, a three-dimensional image can be displayed, as illustrated in FIG. 9c.

Figure 8B:
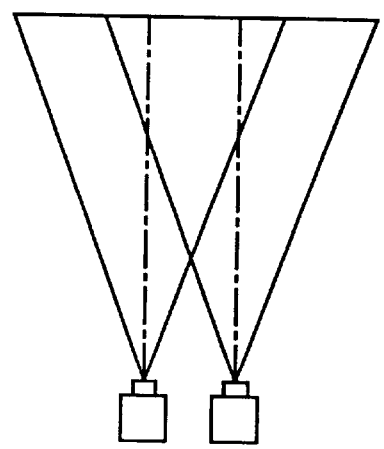
Figure 10A:
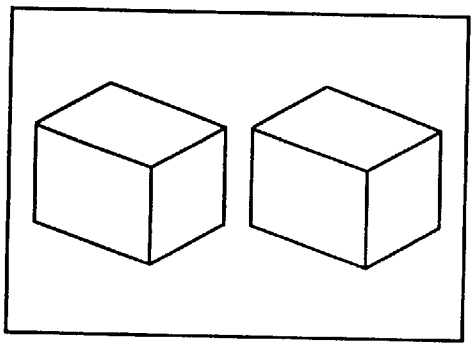
FIGS. 10a through 10c are diagrams showing video and an oblong, two-dimensional fused image of objects when display of a panoramic image is presented.
Figure 10B:
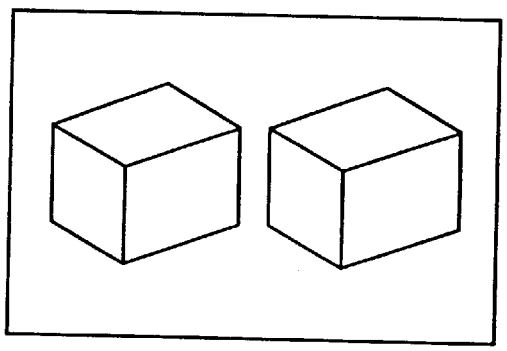
Figure 10C:
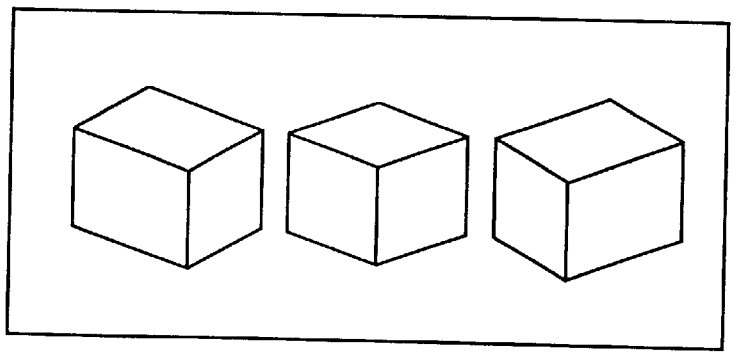

In the first and second display modes, two cameras are placed as shown in FIG. 8b, and video signals obtained from the two cameras as shown in FIGS. 10a, 10b are inputted from the video-signal input terminals 1R, 1L. As a result, the video signals are displayed on the display units 6R, 6L, respectively. By fusing these two video signals, the two images are combined as illustrated in FIG. 10c. This makes it possible to display an oblong (panoramic) two-dimensional image in which the aspect ratios of the display units differ.

Figure 11:
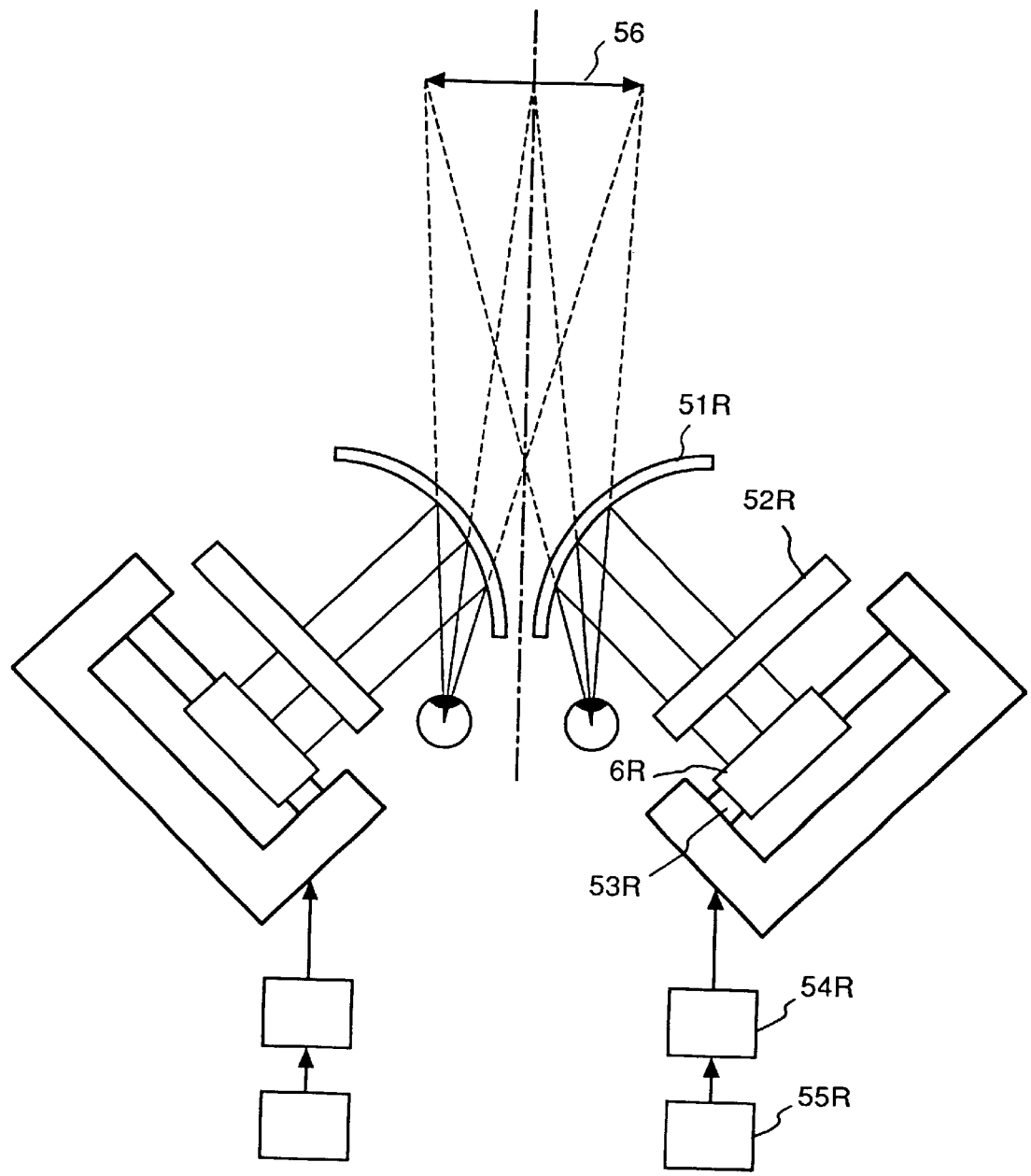
FIG. 11 is a diagram showing the arrangement of the signal processing apparatus of this embodiment as seen from above.
Figure 12:
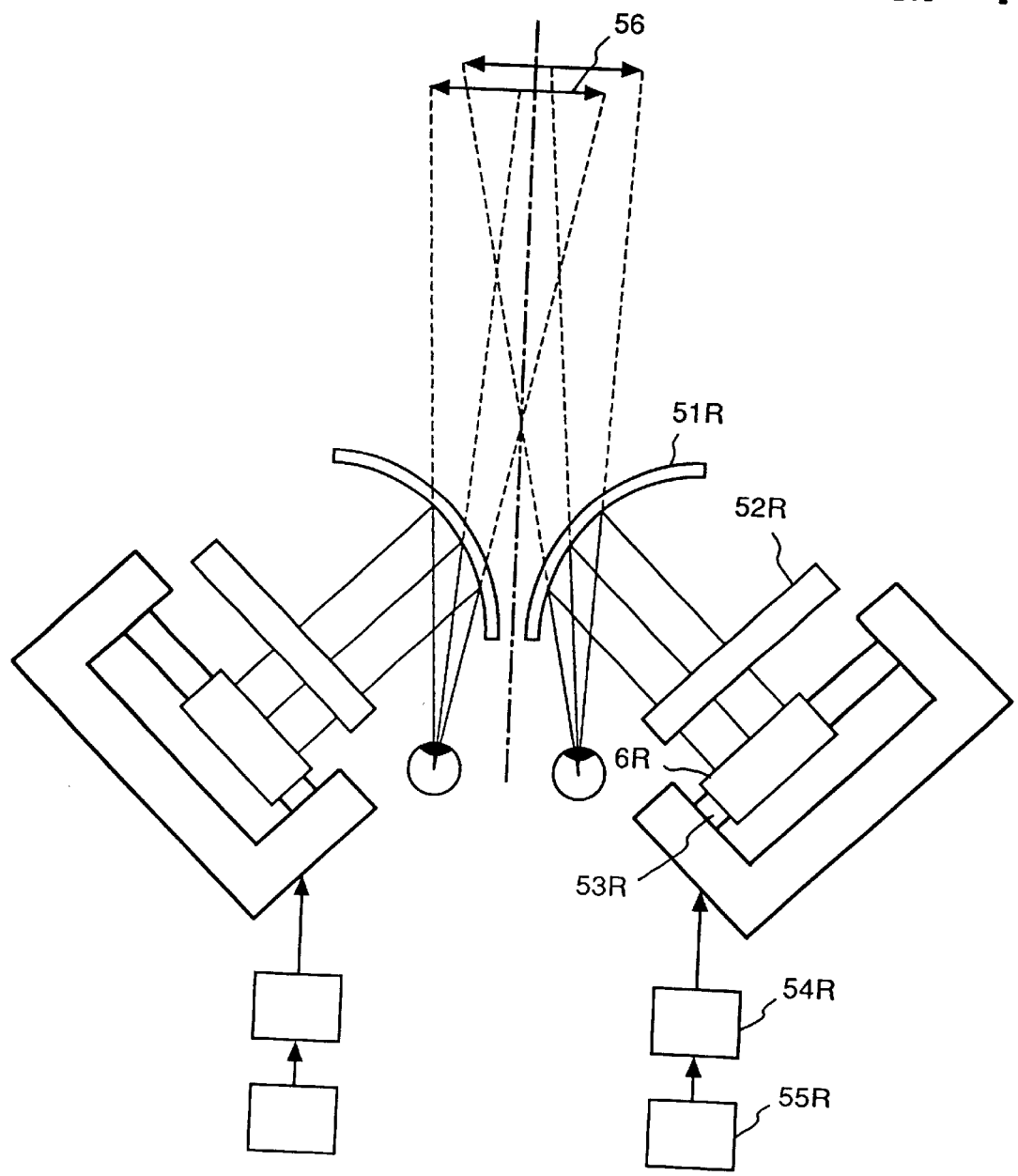
FIG. 12 is a diagram showing the arrangement of the signal processing apparatus of this embodiment as seen from above.

FIGS. 11 and 12 are diagrams showing the arrangement of the apparatus as seen from above. Since the arrangement is symmetrical, only the reference numerals necessary are indicated. Here numerals are shown for the right side only and are followed by the character "R".

As shown in FIGS. 11 and 12, numeral 51R denotes an optical element for forming an imaginary image. The optical element 51R functions to deflect light flux from the display unit 6R in the direction of the wearer's pupil so as to form the image, which is being displayed on the display unit, as an imaginary image in front of the pupil. A relay optical system 52R is inserted to correct for aberration, which could not be sufficiently corrected solely by the optical element 51R, and to form an intermediate image of an object plane (i.e., an image outputted by the display unit 6R). An actuator 53R is for moving the display unit of the optical element 51R which forms the imaginary image. The actuator 53R is controlled by a drive circuit 54R, and the amount of control of the actuator 53R is adjusted by a control adjuster 55R. Numeral 56 denotes the imaginary image of the displayed image.

In the case where a three-dimensional image is to be displayed in this embodiment, the right-eye imaginary image and the left-eye imaginary image are made to coincide, as shown in FIG. 11. If a panoramic image is to be displayed, the positions of the display units 6 are moved so as to overlap part of the right-eye imaginary image and part of the left-eye imaginary image, as illustrated in FIG. 12. As a result, the two imaginary images for the left and right sides can be fused more easily.

When the switch circuit 2R has been connected to the side a and the switch circuit 2L has been connected to the side b, the video signal from the video-signal input terminal 1R is displayed on both of the display units 6R, 6L. This shall be referred to as a third display mode. When the switch circuit 2R has been connected to the side b and the switch circuit 2L has been connected to the side a, the video signal from the video-signal input terminal 1L is displayed on both of the display units 6R, 6L. This shall be referred to as a fourth display mode. Accordingly, in the third and fourth display modes, the same image is displayed on both the left and right display units. This makes it possible to display a two-dimensional image.

It goes without saying that the left and right imaginary images should be made to coincide as shown in FIG. 11 in the third and fourth display modes.

Any of the four modes is selected by the observer using the control panel 110 in FIG. 4. On the basis of a signal from the control panel 110, the switch circuits 2R, 2L are placed in the prescribed states by the control circuit 111, thereby changing over the display mode.

Thus, it is possible to construct a display apparatus in which two- and three-dimensional images can be displayed and switched between with ease.

Figure 5:
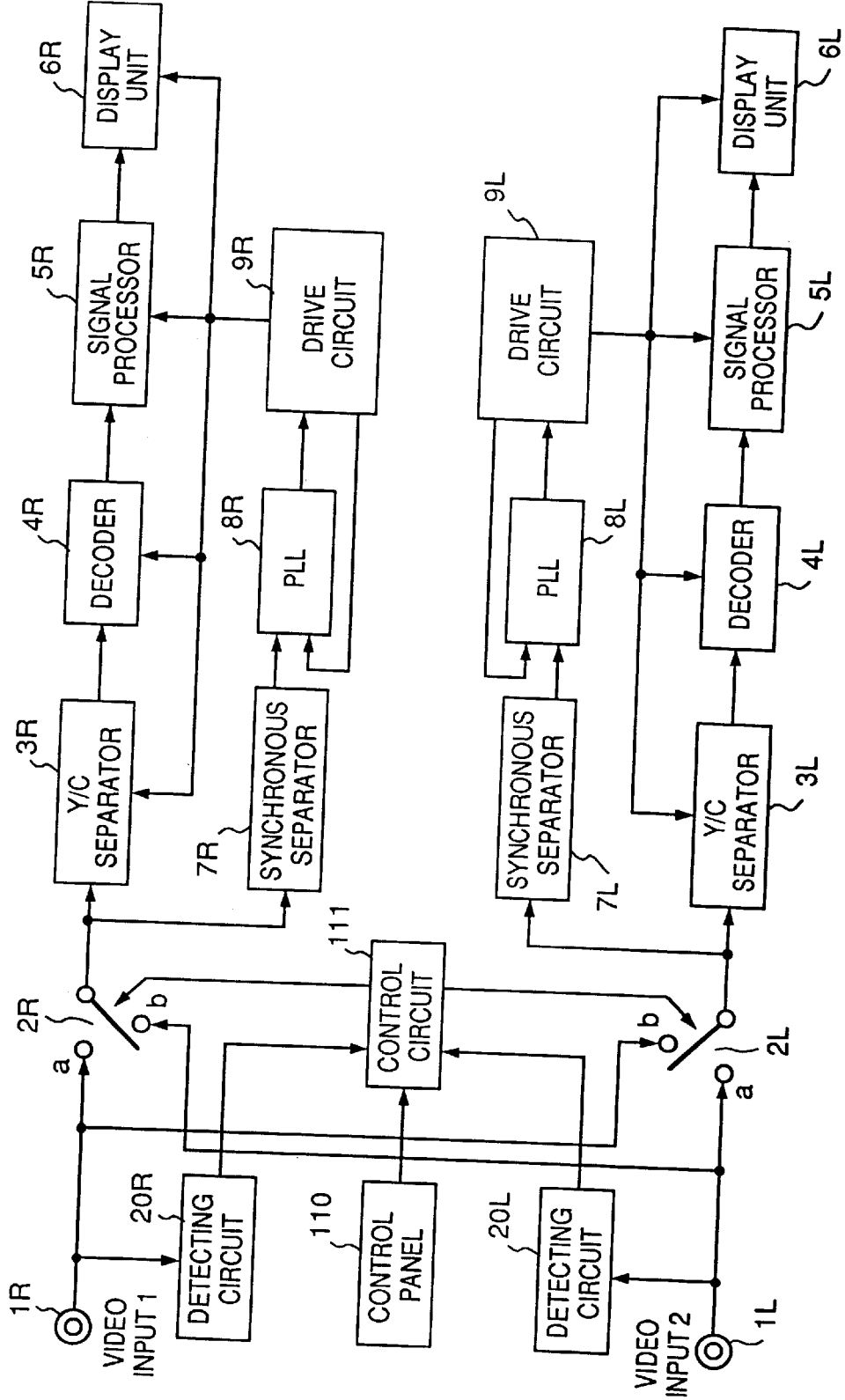
FIG. 5 is a block diagram illustrating the construction of a signal processing apparatus according to a fifth embodiment of the present invention.

FIG. 5 is a block diagram illustrating a signal processing apparatus according to a fifth embodiment of the present invention. Components identical with those shown in FIG. 4 are designated by like reference characters. This embodiment further includes detecting circuits 20R, 20L for detecting the absence or presence of video signals from the video-signal input terminals 1R, 1L.

The operation of the fifth embodiment of the invention will now be described with reference to FIG. 5. When both detecting circuits 20R, 20L detect input of the video signals from the video-signal input terminals 1R, 1L, the control circuit 111 controls in such a manner that the switch circuits 2R, 2L are placed in the first or second display mode. Operation of the circuits in back of the switch circuits 2R, 2L is the same as in the fourth embodiment. When the first display mode has been established, the video signal from the video-signal input terminal 1R is displayed on the display unit 6R and the video-signal input terminal 1L is displayed on the display unit 6L. When the second display mode has been established, the video signal from the video-signal input terminal 1R is displayed on the display unit 6L and the video-signal input terminal 1L is displayed on the display unit 6R.

When the detecting circuit 20L detects that the video signal is not entering from the video-signal input terminal 1L, the control circuit 111 controls so as to place the switch circuits 2R, 2L in the third display mode. When the detecting circuit 20R detects that the video signal is not entering from the video-signal input terminal 1R, the control circuit 111 controls so as to place the switch circuits 2R, 2L in the fourth display mode. In the third display mode, the video input signal from the video-signal input terminal 1R is displayed on both of the display units 6R, 6L. In the fourth display mode, the video input signal from the video-signal input terminal 1L is displayed on both of the display units 6R, 6L.

By adopting this arrangement, effects similar to those of the fourth embodiment are obtained. In addition, when a video signal is entering from each of the two video-signal input terminals, the respective images are displayed on the two display units. When an input signal is being applied only to one of the two video-signal input terminals, this video signal can be displayed on both of the display units. As a result, it is possible to switch automatically between display of a two-dimensional image and display of a three-dimensional image in dependence upon the input signal.

Furthermore, a sixth embodiment of the present invention is an improvement upon the fourth and fifth embodiments. The sixth embodiment is so adapted that when video signals enter both of the video-signal input terminals 1R, 1L and the first or second display mode has been selected in the fourth and fifth embodiments, it is possible to switch from the first display mode to the second display mode or from the second display mode to the first display mode under the control of the control circuit 111 by operating the control panel 110.

By adopting this arrangement, the effects of the fourth and fifth embodiments are obtained. In addition, in a case where video signals to be applied in order to display a three-dimensional image mistakenly enter the wrong video-signal input terminals 1R, 1L so that the three-dimensional display is not presented correctly, the display mode can be changed over. As a result, it is possible to present a correct display and to prevent erroneous operation.

Figure 6:
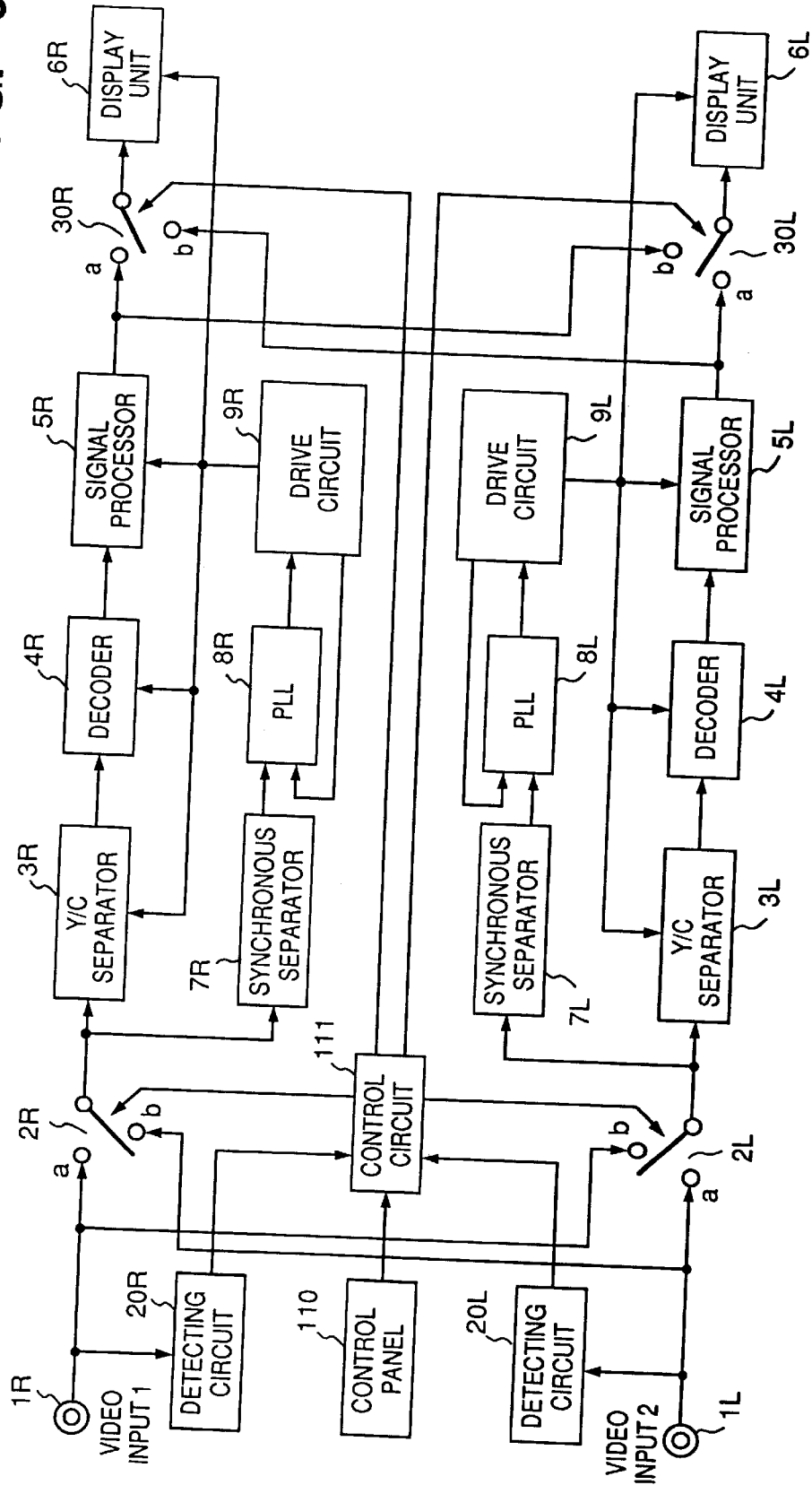
FIG. 6 is a block diagram illustrating the construction of a signal processing apparatus according to a sixth embodiment of the present invention.

FIG. 6 is a block diagram illustrating a signal processing apparatus according to a seventh embodiment of the present invention. Components identical with those shown in FIGS. 4 and 5 are designated by like reference characters. This embodiment further includes switch circuits 30R, 30L for selecting the video signals, which enter the display units 6R, 6L, from the outputs of the signal processing circuits 5R, 5L.

The operation of the seventh embodiment of the invention will now be described with reference to FIG. 6. When both detecting circuits 20R, 20L detect input of the video signals from the video-signal input terminals 1R, 1L, the switch circuits 2R, 2L are both connected to their a side or b side and the switch circuits 30R, 30L are connected to their a side by the control circuit 111, whereby the first or second display mode is established. The operation of each signal processing circuit at this time is the same as in the above-mentioned embodiments. When an input signal from the video-signal input terminal 1L is not detected by the detecting circuit 20L, the control circuit 111 controls in such a manner that the switch circuits 2R, 2L are both connected to their a side, the switch circuit 30R is connected to its a side and the switch circuit 30L is connected to its b side, and the third display mode is established in which the video signal from the video-signal input terminal 1R is displayed on both of the display units 6R, 6L through the signal processing route composed of the circuits 3R, 4R, 5R, 7R, 8R and 9R. When both detecting circuits 20R, 20L detect input of the video signals from the video-signal input terminals 1R, 1L, the switch circuits 2R, 2L are both connected to their a side or b side and the switch circuits 30R, 30L are connected to their a side by the control circuit 111, whereby the first or second display mode is established. The operation of each signal processing circuit at this time is the same as in the above-mentioned embodiments. When an input signal from the video-signal input terminal 1R is not detected by the detecting circuit 20R, the control circuit 111 controls in such a manner that the switch circuits 2R, 2L are both connected to their a side, the switch circuit 3OR is connected to its b side and the switch circuit 30L is connected to its a side, and the fourth display mode is established in which the video signal from the video-signal input terminal 1L is displayed on both of the display units 6R, 6L through the signal processing route composed of the circuits 3L, 4L, 5L, 7L, 8L and 9L.

By adopting this arrangement, effects similar to those of the above-mentioned embodiments are obtained. In addition, when the third or fourth display mode is in effect, a display is presented on both of the display units by using one of the two signal processing routes. As a result, an additional effect obtained is that less current is consumed in comparison with the foregoing embodiments.

It goes without saying that if the video signals which enter from the first and second video-signal input terminals are synchronized, there need be only one synchronous separating circuit, one PLL circuit and one drive circuit.

Figure 7:
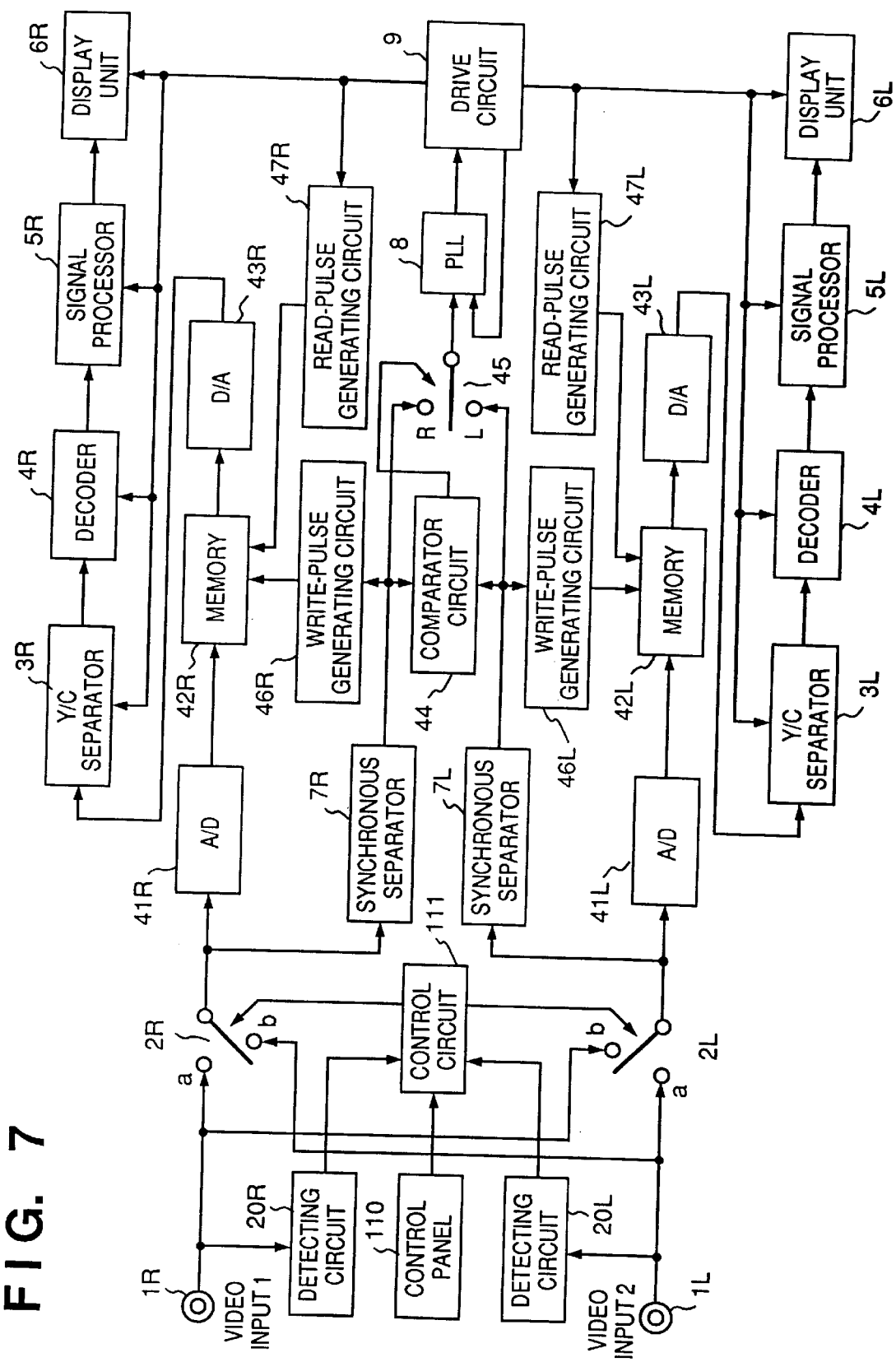
FIG. 7 is a block diagram illustrating the construction of a signal processing apparatus according to a seventh embodiment of the present invention.

FIG. 7 is a block diagram illustrating a signal processing apparatus according to an eighth embodiment of the present invention. Components identical with those shown in FIGS. 4, 5 and 6 are designated by like reference characters. This embodiment includes A/D converting circuits 41R, 41L, memories 42R, 42L, D/A converting circuits 43R, 43L, a comparator circuit 44 for comparing two synchronizing signals, a switch circuit 45 for switching between synchronizing signals, write-pulse generating circuits 46R, 46L which generate write pulses for writing data in the memories 42R, 42L, respectively, and read-pulse generating circuits 47R, 47L which generate read pulses for reading data out of the memories 42R, 42L, respectively.

The operation of the eighth embodiment of the invention will now be described with reference to FIG. 7. When both detecting circuits 20R, 20L detect input of the video signals from both of the video-signal input terminals 1R, IL, the switch circuits 2R, 2L are connected to their a side by the control circuit 111, the video signals enter respective ones of the A/D converting circuits 41R, 41L and synchronous separating circuits 7R, 7L, these signals are converted from analog video signals to digital video signals by the A/D converting circuits 41R, 41L and synchronizing signals are separated from them by the synchronous separating circuits 7R, 7L. The synchronizing signals outputted by the synchronous separating circuits 7R, 7L enter the respective write-pulse generating circuits 46R, 46L, which generate write pulses synchronized to these entering synchronizing signals. The outputs of the A/D converting circuits 41R, 41L are written in the memories 42R, 42L, respectively, at the timing of these pulses. The synchronizing signals outputted by the synchronous separating circuits 7R, 7L further enter the comparator circuit 44, which compares the phases of the two synchronizing signals. If the synchronizing signal produced by the synchronous separating circuit 7R is late, the switch circuit 45 is connected to the R side to supply the signal to the PLL circuit 8. If the synchronizing signal produced by the synchronous separating circuit 7L is late, the switch circuit 45 is connected to the L side to supply the signal to the PLL circuit 8. The synchronizing signal fed into the PLL circuit 8 forms a phase-locked loop to control the driving frequency of the drive circuit 9. The output of the drive circuit 9 enters the read-pulse generating circuits 47R, 47L, which generate read pulses synchronized to this signal. Video signals that have been stored in the memories 42R, 42L are read out of these memories at the timing of these pulses and the read signals are converted from digital to analog signals by the respective D/A converting circuits 43R, 43L. Thereafter, the signals are separated into Y and C signals by the respective Y/C separating circuits 3R, 3L, and the decoders 4R, 4L each convert these inputs into signals of the three primary colors R, G, B. The R, G, B signals are subjected to prescribed processing by each of the signal processing circuits 5R, 5L in order that they can be displayed on the display units, and the processed signals are then supplied to the display units 6R, 6L. This is the first display mode, in which the video signal which has entered from the video-signal input terminal 1R is displayed on the display unit 6R and the video signal which has entered from the video-signal input terminal 1L is displayed on the display unit 6L.

In the case of the second display mode, the switch circuits 2R, 2L are both connected to their b side, whereby the video signal which has entered from the video-signal input terminal 1R is displayed on the display unit 6L and the video signal which has entered from the video-signal input terminal 1L is displayed on the display unit 6R. The operation of the circuitry between these switch circuits and the display units is the same as in the first display mode.

In the third display mode, the switch circuit 2R is connected to the a side and the switch circuit 2L is connected to the b side, whereby the video signal which has entered from the video-signal input terminal 1R is displayed on both of the display units 6R, 6L. In the fourth display mode, the switch circuit 2R is connected to the b side and the switch circuit 2L is connected to the a side, whereby the video signal which has entered from the video-signal input terminal 1L is displayed on both of the display units 6R, 6L.

By virtue of this arrangement, effects similar to those of the above-mentioned embodiments are obtained. In addition, since the video signals displayed on the display units can be synchronized, only one drive circuit for driving the display units and the other circuits of the signal processing circuitry need be provided.

In the embodiments set forth above, cases have been described in which VIDEO signals are inputted as the video signals. However, it goes without saying that the invention is not limited to VIDEO signals; the inputs can be a Y/C input (S input) or R, G, B, SYNC inputs.

In accordance with the fourth to eighth embodiments as described above, two video-signal input terminals, two signal processors and two display units, one of which can be seen only by the left eye and the other of which can be seen only by the left eye, are provided. The video signal for the right eye is sent to the display unit for the right eye and the video signal for the left eye is sent to the display unit for the left eye. A two- or three-dimensional image can be displayed without producing flicker.

Further, if means are provided for synchronizing the video signals which have entered from the two video-signal input terminals in the fourth through eighth embodiments, two signal processors can be replaced by one shared signal processor and two drive circuits for driving the two display units can be replaced by one shared drive circuit.

Further, in the fourth through eighth embodiments, video signals which have entered from two video-signal input terminals are selectively switched between and displayed on two display units in a first or second display mode, whereby a two- or a three-dimensional image is displayed without producing flicker. The same two-dimensional image can be displayed on the two display units in a third or fourth display mode.

Further, in the fourth through eighth embodiments, two detecting units are provided for detecting the absence or presence of video signals inputted from two video-signal input means. Switching between a two-dimensional image display and a three-dimensional image display can be performed automatically depending upon whether or not video signals are being applied to the two video-signal input terminals.

Further, in the fourth through eighth embodiments, when a two-dimensional image is displayed in the third mode or fourth mode, consumed current at the time of use can be reduced by employing either of the two signal processing units.

Further, in the fourth through eighth embodiments, in a case where video signals enter from two video-signal input terminals, video signals supplied to the left and right display units are switched between selectively, whereby it is possible to prevent the video signals from being supplied to the left and right display units erroneously and displayed on the wrong sides.

As many apparently widely different embodiments of the present invention can be made without departing from the spirit and scope thereof, it is to be understood that the invention is not limited to the specific embodiments thereof except as defined in the appended claims.

What is claimed is:

1. A signal processing apparatus comprising:

first and second signal processing means for respectively converting a first video signal and a second video signal into first and second converted video signals, of a prescribed format, capable of being displayed;

first display means for displaying the first converted video signal at a position capable of being seen by an observer's right eye;

second display means for displaying the second converted video signal at a position capable of being seen by the observer's left eye;

first switching means for selectively supplying the first video signal to said first or second signal display means;

second switching means for selectively supplying the second video signal to said first or second signal display means;

control means for controlling said first and second switching means so as to be switched to any of four modes, said four modes being:

a first display mode for displaying the first video signal on said first display means and the second video signal on said second display means;

a second display mode for displaying the first video signal on said second display means and the second video signal on said first display means;

a third display mode for displaying the first video signal on said first and second display means; and a fourth display mode for displaying the second video signal on said first and second display means.

2. The apparatus according to claim 1, wherein the first and second video signals are a pair of parallax image signals.

3. The apparatus according to claim 1, wherein the first and second video signals are each image signals having a wide angle of view in the horizontal direction.

4. The apparatus according to claim 1, wherein the first and second video signals are identical image signals.

5. The apparatus according to claim 1, wherein each of said first and second display means has an optical system which includes an optical element for forming display image information as an imaginary image, and imaginary-image moving means for moving at least one of the imaginary images horizontally.

6. The apparatus according to claim 1, wherein the first and second video signals are a pair of parallax image signals.

7. The apparatus according to claim 1, wherein the first and second video signals are each image signals having a wide angle of view in the horizontal direction.

8. The apparatus according to claim 1, further comprising:

first detecting means for detecting absence or presence of the first video signal; and second detecting means for detecting absence or presence of the second video signal;

the first or second display mode being switched to when both video signals have been detected by said first and second detecting means;

the fourth display mode being switched to when the video signal is not detected by said first detecting means; and the third display mode being switched to when the video signal is not detected by said second detecting means.

9. The apparatus according to claim 1, wherein only one of the first and second signal processing means is used in the third or fourth display mode.

10. The apparatus according to claim 1, wherein when the first display mode or second display mode is in effect, the first display mode and the second display mode are switched between selectively.

11. A signal processing apparatus comprising:

first and second signal processing means for respectively converting a first video signal and a second video signal into first and second converted video signals capable of driving display means comprising a first display for displaying the first converted video signal at a position capable of being seen by an observer's right eye and a second display for displaying the second converted video signal at a position capable of being seen by the observer's left eye; and mode selecting means for selecting at least two modes out of four display modes, said four display modes being:

a first display mode for displaying the first converted video signal on said first display and displaying the second converted signal on said second display;

a second display mode for displaying the first converted video signal on said second display and displaying the second converted signal on said first display;

a third display mode for displaying the first converted video signal on said first and second display; and a fourth display mode for displaying the second converted video signal on said first and second display.

12. The apparatus according to claim 11, wherein the first and second video signals are a pair of parallax image signals.

13. The apparatus according to claim 11, wherein the first and second video signals are each image signals having a wide angle of view in the horizontal direction.

14. The apparatus according to claim 11, wherein the first and second video signals are identical image signals.

15. The apparatus according to claim 11, wherein each of said first and second displays has an optical system which includes an optical element for forming and displaying an image as a virtual image in front of the corresponding pupil of an observer's eye, and further comprising virtual image moving means for moving at least one of the virtual images horizontally.

16. The apparatus according to claim 11, further comprising:

first detecting means for detecting absence or presence of the first video signal; and second detecting means for detecting absence or presence of the second video signal;

the first or second display mode being selected to when both video signals have been detected by said first and second detecting means;

the fourth display mode being selected to when the video signal is not detected by said first detecting means; and the third display mode being selected to when the video signal is not detected by said second detecting means.

17. The apparatus according to claim 11, wherein only one of the first and second signal processing means is used in the third or fourth display mode.

18. The apparatus according to claim 11, wherein when the first display mode or second display mode is in effect, the first display mode and the second display mode can be changed over.

19. A signal processing method comprising:

a first and second signal processing step of respectively converting a first video signal and a second video signal into first and second converted video signals capable of driving display means comprising a first display for displaying the first converted video signal at a position capable of being seen by an observer's right eye and a second display for displaying the second converted video signal at a position capable of being seen by the observer's left eye; and a mode selecting step of selecting at least two modes out of tour display modes, said four display modes being:

a first display mode for displaying the first converted video signal on said first display and displaying the second converted signal on said second display; a second display mode for displaying the first converted video signal on said second display and displaying the second converted signal on said first display;

a third display mode for displaying the first converted video signal on said first and second display;

and a fourth display mode for displaying the second converted video signal on said first and second display.

20. The method according to claim 19, wherein the first and second video signals are a pair of parallax image signals.

21. The method according to claim 19, wherein the first and second video signals are each image signals having a wide angle of view in the horizontal direction.

22. The method according to claim 19, wherein the first and second video signals are identical image signals.

23. The method according to claim 19, wherein each of said first and second displays has an optical system which includes an optical element for forming and displaying an image as a virtual image in front of the corresponding pupil of an observer's eye, and further comprising virtual image moving step of moving at least one of the virtual images horizontally.

24. The method according to claim 19, further comprising:

a first detecting step of detecting absence or presence of the first video signal; and a second detecting step of detecting absence or presence of the second video signal;

the first or second display mode being selected to when both video signals have been detected in said first and second detecting step;

the fourth display mode being selected to when the video signal is not detected in said first detecting step; and the third display mode being selected to when the video signal is not detected in said second detecting step.

* * * * *

UNITED STATES PATENT AND TRADEMARK OFFICE
CERTIFICATE OF CORRECTION

PATENT NO.     : 6,414,649 B1
DATED          : July 2, 2002
INVENTOR(S)    : Satoshi Tonosaki & Yasuyuki Yamazaki It is certified that error appears in the above-identified patent and that said Letters Patent is hereby corrected as shown below:

Title page,
Item [56], References Cited, FOREIGN PATENT DOCUMENTS,
Please delete "JP  0253121 A2  1/1988"
Item [57], ABSTRACT,
Line 10, please add -- ) -- after 2
Line 14, please add -- ) -- after 4

Column 2,
Line 64, please delete "." after "means"

Column 4,
Line 21, please add -- 10 -- after "controller"

Column 11,
Line 51, please delete "3OR" and insert therefor -- 30R --

Column 16,
Line 19, please delete "tour" and insert therefor -- four --

Signed and Sealed this

Eleventh Day of February, 2003

JAMES E. ROGAN
*Director of the United States Patent and Trademark Office*